Nov. 26, 1963   J. E. DUDGEON   3,111,961
REMOVABLE SPRING CHECK VALVE
Original Filed Sept. 7, 1954
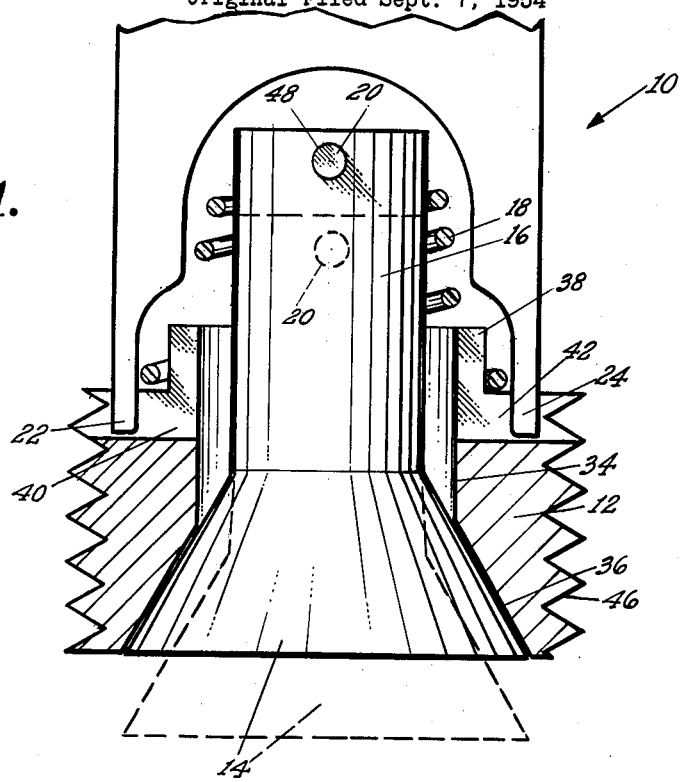
Fig. 1.
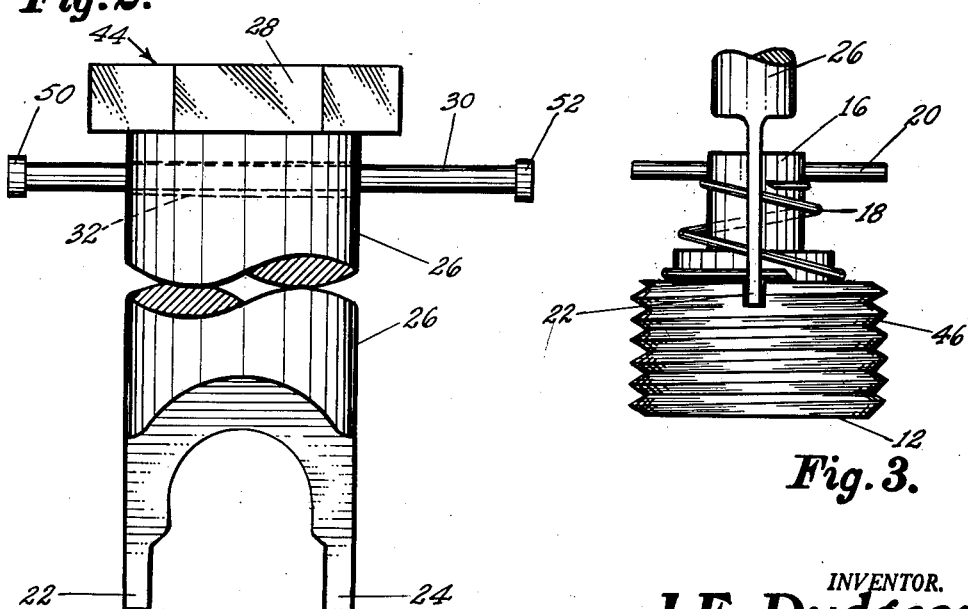
Fig. 2.
Fig. 3.
INVENTOR.
J. E. Dudgeon
Arthur H. Sturges.
Attorney

3,111,961
REMOVABLE SPRING CHECK VALVE
John E. Dudgeon, 1840 N. 49th St., Omaha, Nebr.
Continuation of application Ser. No. 454,565, Sept. 7, 1954. This application Apr. 27, 1959, Ser. No. 814,124
1 Claim. (Cl. 137—327)

This invention relates to spring check valves and more particularly it is an object of this invention to provide a spring check valve that is more quiet and less subject to chattering.

The prior art ball check, the spring ball check and swing check valves have vibrated and chattered loudly and annoyingly.

To this day, such valves still do vibrate and chatter. So unobvious has been the solution to this problem.

In addition to the nuisance of noise, this chattering is very hard on the plumbing system as it causes fluctuation in line pressure.

The water in the system keeps ramming against the chattering valve, shaking the entire plumbing system, and causing the loosening of joints and water leakage.

In some cases the loosening of joints from vibration has caused water damage measured in thousands of dollars.

Sometimes older piping is weak due to pitting and corrosion. In some pitted spots, commonly called "pin points," the only thing that holds back the water pressure is the rust or scale.

In such cases the pounding of the water due to a chattering valve places an impact load on these weak spots or "pin points" in the pipe.

As is well proven, impact loads are very much more likely to cause breakage than consistent pressure.

It is for these reasons that I consider my spring alignment feature to be an inventive concept of great importance—heretofore unknown and unobvious to those skilled in valves.

Heretofore, valve bodies have been expensively made of brass. Another feature of my concept is that it is now possible to tap the inner wall of any opening in a pipe or elsewhere for insertion of my valve.

Such installation is made particularly possible by use of my valve mounting tool. Also, this tool can be used for the replacing of my valve whenever it becomes worn and causes trouble. So another objective is to provide a valve which is designed so it can be easily replaced by cooperation with my tool.

A further very important feature of my invention is the prevention of sticking and binding so common in prior art valves. Sticking and binding due to misalignment of a valve is one of the mysterious problems of plumbing that has never before been completely solved.

I have solved the problem of sticking and have done so by recognizing that it is actually due to misalignment of the valve spring and have conceived of a way to maintain the valve spring in alignment.

A particular object is to provide a valve which so dependably prevents itself from binding and so dependably seats itself accurately that no rubber or other gasket is needed whereby necessity for replacement thereof is eliminated and a tremendous nuisance removed.

A further object is to provide a valve which is simple in operation and simple to manufacture through an elimination of parts.

A particular object is to provide a valve serving all the above purposes and having a body portion the exterior portion of which is threaded completely from one end to the other for deep insertion which uses the same bore which receives the valve stem as the flow passageway since the valve stem is smaller than the bore to permit flow therebetween whereby no other flow openings are necessary for gaining economy of manufacture.

This application is a continuation of the applicant's co-pending patent application Serial No. 454,565, filed September 7, 1954, now abandoned.

Other features and advantages of the invention will appear from the following description taken in connection with the drawings, wherein:

FIGURE 1 is a vertical section through the improved spring check valve with the plug forming the valve body and spring shown in section and with the valve element, stem, and valve actuating tool shown in elevation, the parts being shown with the valve closed in full lines and the valve element and stem being shown in dotted lines in the open position.

FIGURE 2 is a side elevational view of the valve actuating tool, the parts being shown on a reduced scale and a portion of the shank being broken away.

FIGURE 3 is a side elevational view of the valve assembly, the parts being shown on a reduced scale and the view being taken from a point at a right angle to that shown in FIGURE 1.

While one embodiment of the invention is illustrated in the above referred to drawings, it is to be understood that they are merely for the purpose of illustration, and that various changes in construction may be resorted to in the course of manufacture in order that the invention may be utilized to the best advantage according to circumstances which may arise, without in any way departing from the spirit and intention of the device, which is to be limited only in accordance with the appended claim. And while there is stated the primary field of utility of the invention, it remains obvious that it may be employed in any other capacity wherein it may be found applicable.

In the accompanying drawings and in the following specification, the same reference characters are used to designate the same parts and elements throughout, and in which the numeral 10 refers to the invention in its entirety, numeral 12 indicating a plug forming the valve body, numeral 14 a valve element having a stem 16, numeral 18 a conical-shaped spring, and numeral 20 an arm extended through the stem and positioned to hold the upper end of the spring, and, as illustrated in FIGURE 1, the valve is provided with a tool having prongs 22 and 24 extended from a shank 26 and having a head 28 on the opposite end an arm or bar 30 extended through an opening 32 therein.

The valve element 14 is characterized by an enlarged lower portion or head 33 provided with an annular surface disposed opposite and complementarily shaped with respect to the annular valve seat surface 36.

The plug is provided with a bore 34 having a frusto-conical-shaped surface providing an annular valve seat surface 36 in one end and an annular neck or a collar 38 extended from the opposite end. The end on which the collar is positioned is provided with aligned slots 40 and 42 which are positioned to receive the prongs 22 and 24 of the tool which is generally indicated by the numeral 44. The peripheral surface of the plug 12 is provided with threads 46 by which the plug is threaded into a fitting, opening of a pipe line, or the like.

The arm 20 is secured in the opening 48 in the end of the stem 16, such as by brazing or the like and the length of the arm is less than the diameter at the roots of the threads whereby the arm is adapted to pass through the opening in which the plug is threaded.

The bar 30 which is slidably mounted in the opening 32 in the end of the shank 26 of the tool, is provided with knobs 50 and 52 to prevent accidental displacement thereof.

With the parts designed and assembled in this manner a self-contained spring valve unit is provided that may readily be installed in pipe lines, and as pressure builds up in a pipe line the pressure forces the valve element 14 away from the seat 36, such as to the position shown in dotted lines, whereby the pressure is relieved, and as the pressure drops the spring 18 immediately returns the valve element to the seat so that the opening is closed. In this manner pressure is relieved in a pipe line without danger of foreign gases and the like entering the line.

The spring 18 is annular in form and extends around the valve stem 16 and one of its ends extends around the annular neck or collar 38, sufficiently closely fitting the neck or collar and being so cooperatively shaped with respect to the neck or collar 38 as to hold the spring 18 substantially in place.

The body 12 has an annular spring abutment surface 39 surrounding the neck or collar 38 against which the lower end of the spring 18 abuts. The abutment surface 39 and the adjacent end of the spring 18 have a cooperative relationship for holding this spring in alignment with the position the stem 16 is in when the valve is closed.

It is preferred that the spring have both of its ends lying substantially in parallel planes normal to the elongated stem 38. It is further preferred that the side of the valve body 12 which is adjacent to and surrounding the outer side of the neck 38 be flat and lying in a plane normal to the elongated valve stem 16 for receiving the adjacent end of the spring 18 in abutment thereagainst. This tends to hold the spring in a desired position.

The other end of the spring, which is the upper end as seen in FIG. 1, preferably also has its outer end lying substantially in a plane for bearing against the underside of the arm 20.

It will be seen that the bar arm 20 functions as a spring-engaging means attached to the stem 16 adjacent the upper end of the spring. The upper end of the spring and the spring-engaging end retaining means are so cooperatively shaped and correlated that the spring urges the stem in a direction in alignment with that position the stem assumes when the valve is closed.

It will be seen that this construction is capable of materially preventing spring mis-alignment, stem mis-alignment and valve binding and chattering independently of the relationship between the upper end of the spring 18 and the stem.

However, it will also be seen, particularly in FIG. 3, that it is preferred that the upper terminal and coils of the spring 18 extend sufficiently around and sufficiently snugly fit the stem as to hold the stem in a desired alignment with the valve seat whereby this feature also materialy maintains the stem in alignment with its seated position at all times and thereby also materially reduces spring mis-alignment, materially prevents the spring from binding on the valve stem, thus reducing valve binding and chattering.

The valve assembly is threaded in threaded openings in the wall of a pipe, and the valve is inserted from the inside of the pipe.

It will be seen that the neck 38 is of a lesser width than the body 12 whereby the body is larger inwardly of the neck for receiving the spring 18 thereagainst.

Also it will be seen that the other end of the valve element which is disposed away from the head 33 is disposed extending through and being of a lesser transverse size than the adjacent wall of the bore 34 for letting fluid pass between the wall of the bore 34 and the valve stem at times when the valve is open. This makes it unnecessary to have any other flow openings through the body 12 for gaining an economy of manufacture.

The arm 20 serves as a spring retainer means and so can be referred to as a spring retainer means or arm 20.

The slot 42 defines at least two spaced recesses 43 in its end portions when the end portions of the slot 42 are recognized to be also recesses, and the recesses 43 receive the tool ends 22 and 24, and the recesses 43 have wall surfaces 43' extending generally longitudinally with respect to the axis of the cylindrical body 12, and the wall surfaces 43' are adapted to receive end portions of an insertion tool for rotating the body by engagement of the tool against the wall surfaces 43' of the recesses 43.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts, such as come within the purview of the invention claimed may be resorted to, in actual practice, if desired.

I claim:

A spring check valve comprising a valve body having a cylindrical externally threaded body portion having a neck extended from one end thereof, said neck being of lesser width than said body in a direction normal to the axis of said cylindrical body and said body having a bore extended longitudinally therethrough and through said neck, said bore being uninterrupted throughout its entire length, the end of the valve body opposite to the end from which the neck extends having a frustro-conically shaped concave surface providing a valve seat therein and said valve seat being in the end of said bore, those portions of said body which are threaded being integral with that portion of said body on which said valve seat is formed, the end of said body from which said neck extends having at least two spaced recess means having wall surfaces extending generally longitudinally of said axis and adapted to receive thereagainst end portions of an insertion tool for rotating said body by the pressing of said tool against said wall surfaces of said recess means respectively, a valve element having a stem with a frusto-conically shaped head at one end extended through the bore of the valve body and positioned with the head in registering relation with said valve seat and the end of the stem protruding from said neck, a spring retainer means attached to and laterally protruding from the end of the stem protruding from said neck, and a substantially frustro-conically shaped spring extended around said stem and positioned with its small end bearing against said spring retainer means and its large end nested around said neck and bearing against said body adjacent said neck, that other end of said valve stem which is opposite said head extending through and being of lesser transverse size than the adjacent wall of said bore for letting fluid pass between the wall of said bore and said other end of said valve stem.

(References on following page)

References Cited in the file of this patent

UNITED STATES PATENTS

| | | |
|---|---|---|
| 109,813 | Evans | Dec. 6, 1870 |
| 712,929 | Hedstrom | Nov. 4, 1902 |
| 825,588 | Demarest | July 10, 1906 |
| 900,731 | Heitger | Oct. 13, 1908 |
| 938,064 | Lange | Oct. 26, 1909 |
| 999,829 | McNutt | Aug. 8, 1911 |
| 1,260,663 | Gould | Mar. 26, 1918 |
| 1,397,876 | Meldal | Nov. 22, 1921 |
| 1,554,683 | Mount | Sept. 22, 1925 |
| 1,675,992 | Sherman | July 3, 1928 |
| 1,695,722 | Smith | Dec. 18, 1928 |
| 1,779,421 | Cox | Oct. 28, 1930 |
| 2,784,737 | Kelly | Mar. 12, 1957 |

FOREIGN PATENTS

| | | |
|---|---|---|
| 1,035,787 | France | Apr. 22, 1953 |
| 1,053,707 | France | Sept. 30, 1953 |
| 472,648 | Canada | Apr. 3, 1951 |